United States Patent [19]

Koka et al.

[11] Patent Number: 4,760,447
[45] Date of Patent: Jul. 26, 1988

[54] CALIBRATION PATTERN AND METHOD FOR MATCHING CHARACTERISTICS OF VIDEO MONITORS AND CAMERAS

[75] Inventors: Narasimha R. Koka, Richmond Hts.; William E. Szabo, Olmsted, both of Ohio

[73] Assignee: Picker International, Inc., Highland Hts., Ohio

[21] Appl. No.: 891,749

[22] Filed: Jul. 31, 1986

[51] Int. Cl.[4] .................. H04N 17/00; H04N 7/08
[52] U.S. Cl. .................... 358/139; 358/142; 358/10; 354/20
[58] Field of Search .............. 358/139, 142, 101, 10; 354/20

[56] References Cited

U.S. PATENT DOCUMENTS

| | | | |
|---|---|---|---|
| 2,380,244 | 7/1945 | Jones et al. | 354/20 |
| 4,093,960 | 6/1978 | Estes | 358/139 |
| 4,106,846 | 8/1978 | Russin | 358/10 |
| 4,533,950 | 8/1985 | Harshbarger | 358/139 |

OTHER PUBLICATIONS

"Test Pattern for Video Displays and Hard-Copy Cameras", J. E. Gray et al., Radiology, pp. 519–528, Feb. 1985.

Primary Examiner—James J. Groody
Assistant Examiner—John K. Peng
Attorney, Agent, or Firm—Fay, Sharpe, Beall, Fagan, Minnich & McKee

[57] ABSTRACT

A calibration pattern (FIG. 2) is utilized to adjust the calibration of a video monitor (C) and a multi-format camera (D). The multi-format camera (D) includes a video display (12) and photographic equipment (20) internally therein such that received signals indicative of an image are turned into a photograph. The test pattern includes a first region (30) having a background (34) and a series of holes or dots (36) thereon. Each hole has progressively greater contrast with the first background such that the number of visible holes is indicative of whether the video monitor and multi-format camera are in proper calibration. A second region (40) is similar to the first region but has gray holes on a white background. A third region (50) has a plurality of tuning fork-like subregions having different gray scales levels. The brightness of a fourth region (70) varies sinusoidally. A fifth region (80) has square holes and a sixth region (90) has circular holes. The holes are of incrementally displaced brightness levels against a black or white background. The camera is initially calibrated in a conventional manner using photodensitometer measurements. To verify the calibration subsequently, another photograph is taken and the number of visible subregions in each region are compared with the reference photograph. The brightness and contrast calibration of the video monitor are adjusted until the number of visible subregions matches the reference photograph.

22 Claims, 2 Drawing Sheets

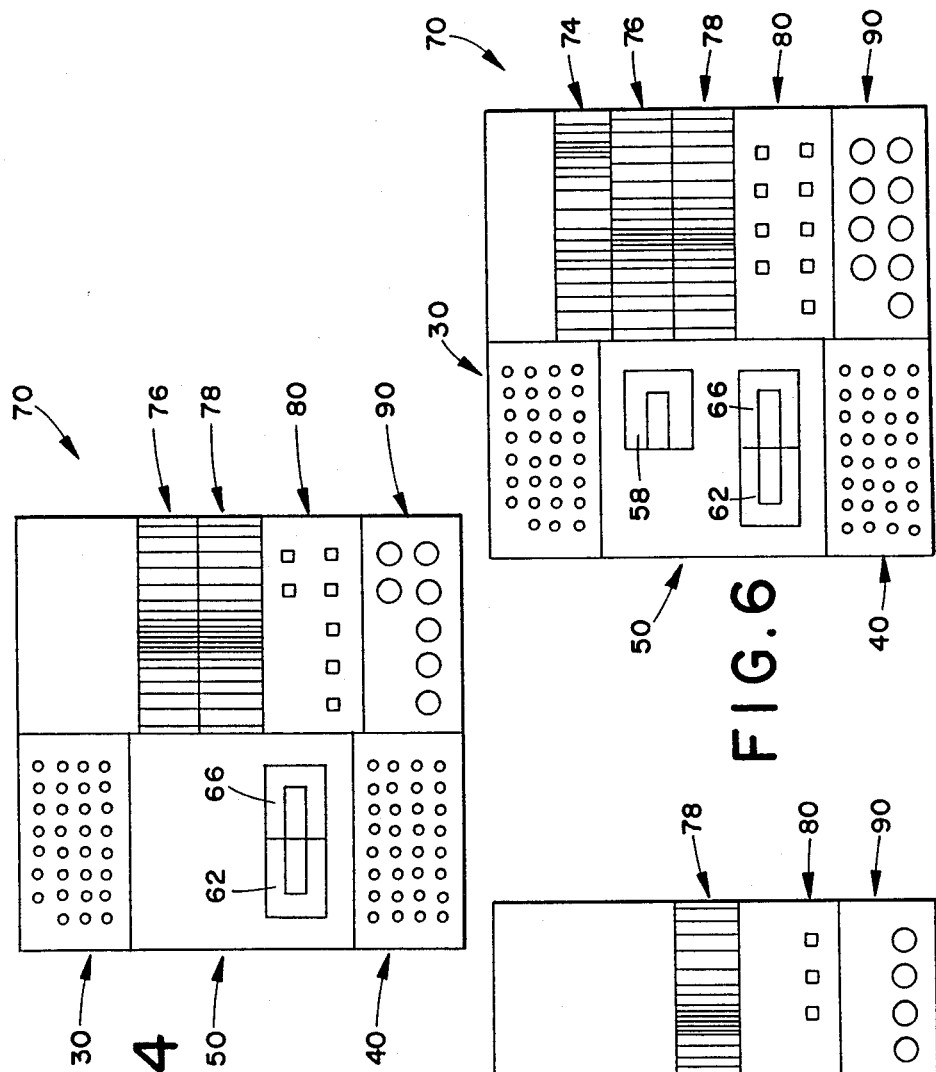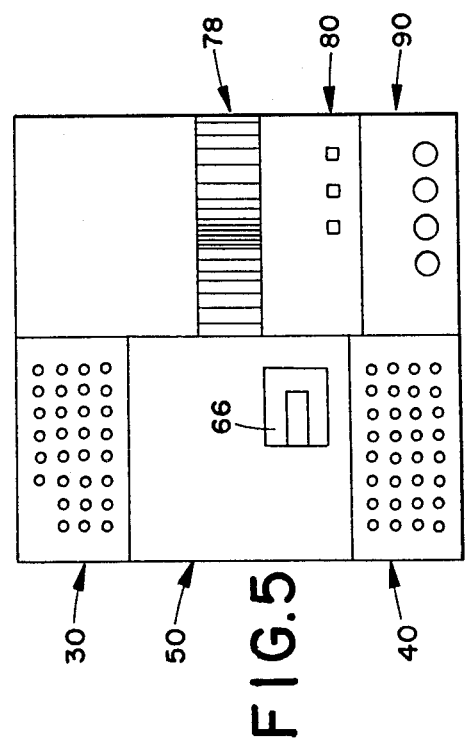

CALIBRATION PATTERN AND METHOD FOR MATCHING CHARACTERISTICS OF VIDEO MONITORS AND CAMERAS

BACKGROUND OF THE INVENTION

The present invention relates to the art of image calibration. It finds particular application in conjunction with the calibration of video to photographic film cameras, video monitors, and the like. However, it is to be appreciated that the invention has broader applications in the calibration of electronic imaging, video electronics, diagnostic photographic imaging equipment, and the image representations thereof.

Techniques for generating electronic images from computer memory on a video display device are well understood in the art. See *The McGraw-Hill Computer Handbook*, Section 20 (1983).

Heretofore, photographic cameras and video monitors have commonly been interconnected with medical diagnostic imaging equipment. The cameras included an internal video display for converting electronic image signals into a suitable display for exposing photographic film. An appropriate lens, shutter, aperture, and the like were disposed between the internal video display on a film transport or carriage. Upon initial installation, the brightness and contrast of the internal display, the shutter speed and the aperture were set or adjusted by trial and error. Typically, the density range of photographic film extended from 0.16 to 2.80. However, the extremes of this range had a non-linear response. To avoid the non-linear region, the internal video monitor and the camera exposure settings were commonly adjusted until white regions had an optical density of about 0.24 or greater and the black regions had an optical density of 2.26 or less. The gray scales were then determined by the optical densities at equal intervals therebetween. This calibration required trial and error and the use of a densitometer to determine that the photographic images, in fact, had the optical densities required by the calibration standards.

After initial installation, one could check the calibration of the camera by taking one or more additional photographs and examining the optical density of the black, white, and gray scale regions to determine if the optical density still met the calibration standards. However, optical densitometers were relatively expensive and complex to operate, rendering the procedure for checking the calibration time consuming and expensive.

Once the camera was calibrated, an analogous calibration procedure was performed on the video monitor. Using appropriate optical intensity measuring equipment, the brightness and contrast of the video monitor were adjusted until calibration specifications are met. This adjustment was complicated by the differences in brightness levels in the video and photographic images. When the photographic image was viewed on a conventional light box, the white areas had a light intensity of about 600-800 foot lamberts. Whereas, the same white areas on a video monitor had a light intensity of about 10-20 foot lamberts.

Again, the optical intensity measuring equipment was relatively expensive and cumbersome to use. Such video monitor calibrations were further expensive in that expensive medical diagnostic equipment and optical intensity equipment were tied up for extended durations.

Due to the complexity of adjusting the video monitors and because the brightness and contrast controls were commonly accessible to the user, there was a tendency for the radiologist or other user to adjust the brightness and contrast until a pleasing image was attained. This manual adjustment of the video monitor commonly resulted in gray scale and other image differences between the image viewed on the video monitor and the permanent record made on photographic film. These differences between the on-line diagnostic image and the permanent photographic diagnostic images could lead to errors in the medical diagnosis.

The present invention contemplates a new and improved calibration procedure and calibration pattern which eliminates the above referenced problems and others.

SUMMARY OF THE INVENTION

In accordance with one aspect of the present invention, a method is provided for verifying the calibration of cameras for photographing images generated from electronic data. The camera is inirially calibrated using optical densitometers and other sophisticated equipment as may be appropriate to bring the camera into a preselected initial calibration. After the initial calibration, a calibration pattern is displayed and photographed to produce a reference photograph. The calibration pattern includes at least two brightness and contrast calibration regions, each region having a background portion and a plurality of subregions. Each subregion within a given region has progressively greater contrast with the background portion such that the number of visible subregions and the degree of visibility thereof varies with the brightness and contrast settings. At a subsequent time, the calibration is verified by again displaying and photographing the calibration pattern to produce a second photograph. The number of visible subregions in corresponding regions of the reference and second photographs are compared to determine whether the camera is still in calibration.

In accordance with a more limited aspect of the invention, the same test pattern is displayed on a video monitor. The brightness and contrast adjustments of the video monitor are adjusted until the display on the video monitor matches the reference photograph.

In accordance with yet another aspect of the present invention, a method of verifying the brightness and contrast calibration of a video monitor display of medical diagnostic images and the like is provided. The video monitor is initially calibrated to preselected specifications. The initial calibration may optionally include the use of sophisticated optical intensity meters and the like as may be appropriate. Immediately following the initial calibration, a calibration pattern is displayed. The calibration pattern includes at least two brightness and contrast calibration regions, each region having a background and a plurality of subregions. In each region, the subregions each have progressively greater contrast with the background portion such that the number of visible subregions varies with brightness and contrast settings. The number of visible subregions of each calibration region is recorded. At a subsequent time, the calibration is verified by again displaying the same calibration pattern and comparing the number of visible subregions with the recorded numbers of visible subregions.

In accordance with yet another aspect of the present invention, a calibration pattern is provided. The calibration pattern includes at least two regions. Each region has a background portion and a plurality of subregions. Within each region, the subregions have progressively greater contrast with the background portion. In this manner, the number of subregions visible within each region varies with brightness and contrast settings of video equipment on which the calibration pattern is displayed.

A first advantage of the present invention is that it enables an operator to verify the calibration of video photographic equipment without an optical densitometer or other sophisticated equipment.

Another advantage of the present invention is that it enables an operator to verify correspondence between a video photographic camera and a video monitor display by manually comparing two images.

Yet another advantage of the present invention is that it facilitates the calibration of video monitor displays to provide the same brightness and contrast setting from day to day without the use of electronic measurement and calibration equipment.

Still further advantages of the present invention will become apparent to those of ordinary skill in the art upon reading and understanding the following detailed description of the preferred and alternate embodiments.

BRIEF DESCRIPTION OF THE DRAWINGS

The invention may take form in various steps and arrangements of steps and in various elements and arrangements of elements. The drawings are only for purposes of illustrating a preferred embodiment and are not to be construed as limiting the invention.

FIG. 4 is a graphic illustration of a calibration pattern in accordance with the present invention in preselected proper calibration;

FIG. 5 is a graphic illustration of the calibration pattern of FIG. 4 below the preselected proper calibration; and, FIG. 6 is a graphic illustration of the calibration pattern of FIG. 4 above the preselected proper calibration.

DETAILED DESCRIPTION OF THE PREFERRED EMBODIMENTS

Figure 1:
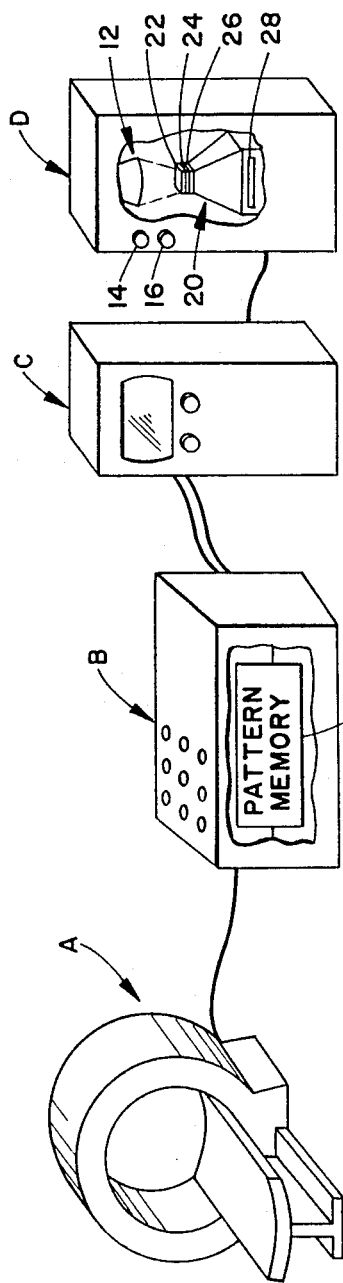
FIG. 1 is a diagrammatic illustration of a medical diagnostic imaging system.

With reference to FIG. 1, a medical diagnostic apparatus A such as a CT scanner, magnetic resonance image apparatus, digital x-ray, or the like examines the patient and generates electrical signals indicative of an image of a selected patient portion. A control module B selectively controls the medical imaging apparatus and receives the electronic image and other signals therefrom. A video monitor C is interconnected with the control module for generating a man-readable display from the electronic signals. A camera means D converts the electronic signals into a hard copy of the image, such as a photograph. Most commonly, black and white positive film is utilized such that the images are recorded directly on the photographic film for display on a conventional light box. The control module B is selectively controllable to replace the medically diagnostic electronic signal with a preselected electronic signal representing a calibration pattern, particularly the calibration pattern of FIG. 2, from a calibration pattern electronic memory means 10.

The hard copy camera D includes an internal video monitor 12 or other display means for converting the electronic image signals into a display of sufficient intensity to expose photographic film. The internal display means 12 has a brightness control 14 and a contrast control 16 for adjusting the brightness and contrast of the display. A photographic means 20 includes a lens 22, an aperture or diaphragm 24, and a shutter 26. Preferably, the aperture setting is fixed and the shutter time is adjustable to durations that are long enough to average out the raster lines of the internal display. The lens focuses the image on a film support assembly 28, particularly on photographic film supported thereby. In a normal calibration procedure, the aperture opening and the shutter speed are set in accordance with preselected specifications. The brightness and contrast of the internal display are adjusted until the black, white, and gray portions of the image on the exposed film meet the preselected specifications.

The hard copy of the image on film is commonly the storage medium for the image as well as the primary tool for diagnostic evaluation. Accordingly, it is of the utmost importance that the hard copy camera means D be in proper calibration adjustment.

Figure 2:
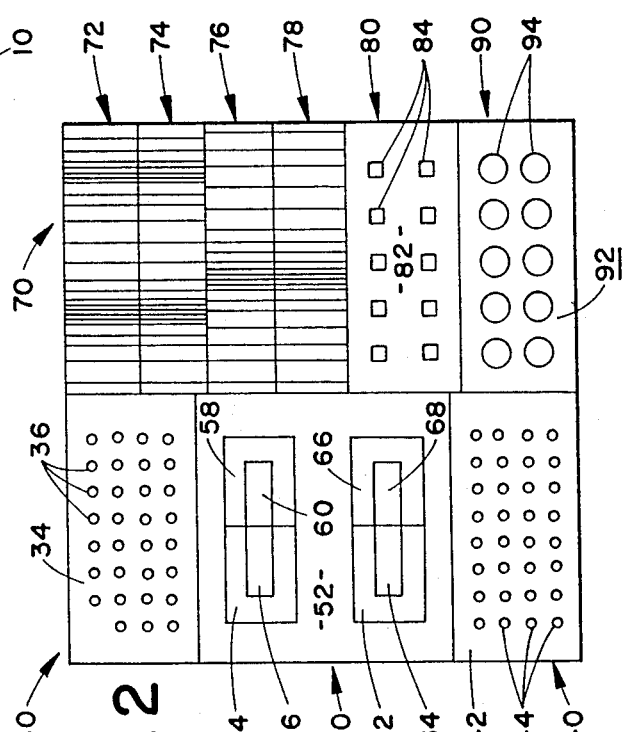
FIG. 2 is a diagrammatic illustration of a calibration pattern in accordance with the present invention.

With particular reference to FIG. 2, the calibration pattern includes a plurality of regions. Each region includes a background portion and a plurality of subregions with differing levels of gray scale. By comparing which subregions are distinguishable from the background, the operator can determine without a sophisticated optical densitometer or intensity equipment whether the camera means D is in proper calibration.

Digital video monitors have discrete gray scale levels which can be displayed. A typical monitor may have 256 gray scale levels, although higher resolution monitors may have 512, 1024, or more gray scale levels. For consistency of discussion, the gray scale can also be described in luminance units in which 0% is full black and 100% is full white.

The calibration pattern includes a first region 30 which has a black background 34 and a plurality of subregions or holes 36 with varying gray scale. More specifically, there are 32 subregions or holes, each of which is two pixels by two pixels. The holes are spaced sufficient distances that the illumination from one does not affect the surrounding holes. Each of the subregions has a different one of the 32 gray scales varying in even 3.125% increments from 0% to 100%. On a video monitor with 256 available gray scale levels, each hole differs by eight available gray scale levels from the adjacent holes. Starting in the upper left hand corner and working towards the lower right hand corner, each hole is progressively one gray scale less black than the preceeding one. The first or upper left hole is full black or 0%. The second hole has a brightness of 3.125%, the third 6.25%, and so forth. The last or 32nd black is full white.

A second region 40 has a white background 42 and an array of 32 two pixel by two pixel subregions or holes 44 of varying gray scale. In the preferred embodiment, the first or upper left hole is full black, the last or lower right hole is one increment, 3.125% less from full white, and the holes in between each differ by one 3.125% increment. In proper calibration, all holes but the lower right one are easily discernable and the lower right is just noticeable.

The ability to detect a target in an image depends not only on such properties as the brightness and size but also on the background against which the target appears. The black and white backgrounds are chosen because the brightness-contrast characteristic curve of photographic film tends to become non-linear in the extreme black and white regions. If all 32 gray scale shades appear properly against black and white backgrounds then these shades will also be visible against the intermediate gray level backgrounds. Optionally, the pattern may include one or more analogous regions with gray backgrounds.

A third region 50 detects low contrast resolution between 0% and 6.4%. The third section includes a black background 52 and a plurality of subregions arranged in generally tuning fork-like patterns. A first U-shaped subregion 54 is scaled with a first, most black of the gray scale levels. A first central bar 56 and a second U-shaped subregion 58 are both scaled with a second gray scale level. A second bar 60 and a third U-shaped subregion 62 are both scaled with a third gray scale level. A third bar 64 and a fourth U-shaped subregion 66 are both of a fourth gray scale level. A fourth bar 68 has a fifth or least black gray scale level of 6.4% illumination. In the preferred embodiment, the first through fifth gray scale levels are each twice as light as the preceding level. Specifically, the first gray scale level is one gray scale off from full black ($2^0$), the second is two levels off ($2^1$), and the third is four levels off ($2^2$) and so forth through the fifth gray scale level which is $2^4$ levels off from full black. That is, the first level is 0.4%, the second is 0.8%, the third is 1.6%, the fourth is 3.24%, and the fifth is 6.4%. Because five gray scale levels are provided in the range of the first two holes of the first region, the third region provides a finer, more precise adjustment. The number of visible subregions, distinguishable boundaries among the subregions, and distinguishable subregion-background boundaries enable the viewer to determine whether the display is in appropriate calibration.

Figure 3:
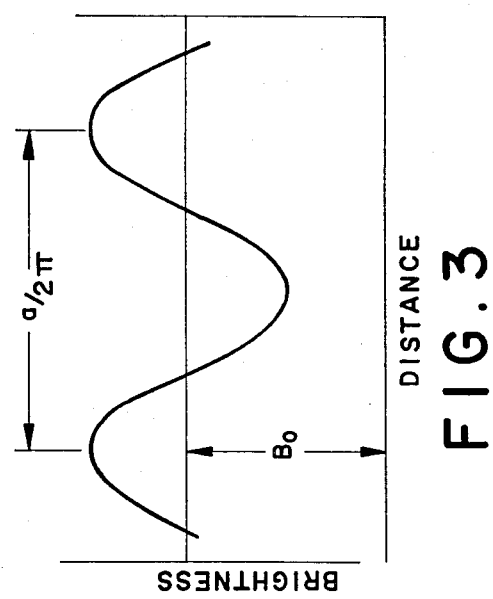
FIG. 3 is a graphic illustration of the intensity of a sine wave grating portion of the pattern of FIG. 2.

With continuing reference to FIG. 2 and further reference to FIG. 3, a fourth region 70 has a grating pattern whose brightness varies in a sinusoidal manner. The brightness of the sine wave gradient may be represented by the formula:

$$B(x) = B_o + \Delta B * \sin(ax) \quad (1)$$

where $(a/2\pi)$ is the spatial frequency of the stripes in the grating pattern. The amplitude, $\Delta B$ and the average intensity level B may be expressed in luminance units. The sine wave grating pattern region 70 has four subregions 72, 74, 76, and 78 each of which have different amplitudes, frequencies, or complexities. More specifically, the first grating portion 72 and the second grating portion 74 are of the same frequency but vary in intensity. In the preferred embodiment, the brightness of the first two grating portions is described by:

$$B(x) = (0.27\%) + (0.27\%)*\sin(\pi x/20) \quad (2)$$

$$B(x) = (0.40\%) + (0.40\%)*\sin(\pi x/20) \quad (3)$$

Because these two gratings differ from black by 0.54% and 0.80%, respectively, both vary over gray scale ranges that are smaller than the gray scale of the second subregion gray scale level of the third region 50. Accordingly, an even more precise gray scale adjustment is provided.

The third and fourth grating patterns are complex or superimposed sine functions. The brightness of which in the preferred embodiment is represented by:

$$B(x) = (0.80\%) + (0.80\%)*\sin(\pi x/20) + (0.27\%)*\sin(\pi x/60) \quad (4)$$

$$B(x) = (0.80\%) + (0.80\%)*\sin(\pi x/30) + (0.80\%)*\sin(\pi x/90) \quad (5).$$

A fifth region 80 has a black background portion 82 and a plurality of subregions or holes 84. In the preferred embodiment, there are ten subregions, each of which is a four pixel by four pixel square. The brightness of the ten subregions each varies linearly from the minimum, full black brightness of 0% to the maximum brightness of 2.7%. The brightness of each hole varies from the minimum brightness to the maximum brightness in uniform steps of 0.27%. In the preferred embodiment the brightness of each of the ten holes is given by the formula:

$$B(i) = B_o + \Delta B * i$$

where $B_o$ is the black background, i is the number of the hole, and $\Delta B$ is the unit change in brightness, in the preferred embodiment, expressed in luminance units, 0.27%.

A sixth region 90 also has a black background portion 92 and a plurality of subregions 94. In the sixth region, the subregions 94 are sharp-edged circular holes. The holes vary in uniform 0.27% steps from the completely black background of 0% brightness to the tenth hole at 2.7% brightness, i.e. in accordance with Equation (6).

In operation, the hard copy camera means D is first calibrated using photodensitometers or the like to utilize the maximum effective density range available on the film. The video monitor C is then calibrated to match the contrast characteristics of the hard copy camera means.

Typically, the photographic film has a density which ranges from 0.16 to 2.8. However, densities of white below 0.24 and densities of black greater than 2.26 are non-linear. Hence, it is preferable that the hard copy camera be calibrated such that the exposed film records 32 gray scale levels with one extreme of the gray scales which represents full white having an optical density of 0.24, another extreme which represents full black having an optical density of 2.21, and 31 gray scales therebetween in evenly spaced increments. Typically, the video display 80 is adjusted to an appropriate brightness and contrast. Film of the appropriate size, e.g. 8×10 film, is placed in the camera. A proper exposure time, preferably on the order of one or two seconds to allow adequate time to blend the raster lines in the exposed image, is selected. The brightness and contrast settings are brought to their minimum position. A conventional gray scale pattern which has fourteen blocks that range in brightness from 0% or black to 100% or white with twelve intermediate steps of 6.25% is displayed. Multiple exposures of the pattern are taken, each with a different setting of the brightness control.

After processing the film, a densitometer is used to measure the optical density of the film. The brightness setting, which produces an optical density of 0.24 on the 100% or white scale block, is selected. With the brightness setting fixed, the contrast setting is adjusted until the preselected optical density for the black or 0% brightness block is achieved, typically, an optical intensity of 2.21.

Because changing the contrast setting of the video monitor may alter the optical density recorded by the film for the full white or 100% block, the optical density of the full white block must again be measured with the densitometer. The brightness and contrast settings of the video monitor 80 are iteratively adjusted until the full white and full black box are each recorded on the film with the preselected optical densities.

With reference to FIG. 4, when the hard copy camera is properly calibrated, 31 holes of region 30 and 32 holes of region 40 should be visible. The first hole in region 30 should not be visible. In the third region 50, the first U-shaped subregion 54 should not be visible, the second U-shaped or tuning fork subregion 58 should be just perceptible, and the third and fourth U-shaped subregions 62 and 66 should be easily recognized.

The viewing monitor is calibrated to match the reference hard copy photograph. The film is displayed on a light box and observations are made for the visible region in the pattern. The operator then adjusts the brightness and contrast settings of the video monitor C until the images match. In particular, the same numbers of subregions in each section are equally visible to the operator's eye as in the reference photograph. In one video monitor calibration sequence, the ambient light in the room is adjusted to a normal working level. In the normal working illumination level, the ambient light level is high enough to permit the operator to see the key board easily yet low enough not to degrade the perceived contrast on the viewing image. The brightness and contrast controls are turned to the extreme dark (counter clockwise) position. The brightness control is adjusted such that the raster lines of the video monitor are just perceptible. The calibration pattern is then displayed and the contrast control is adjusted until the same subregions, preferably 31 holes in region 30 and 32 holes in region 40, the same tuning fork subregions, etc. are visible. The number of holes visible in first and second regions 30 and 40 perform an initial or coarse calibration of the contrast.

The contrast is more finely tuned by adjustment until subregion 58 is just noticeable, subregions 62, and 66 of the third region 50 are easily noticeable and region 54 is not visible. Further fine tuning of the contrast control is utilized to bring the sine wave gratings of region 70 into conformity with the film. The contrast control further brings the square hole pattern of region 80 and the round hole pattern of region 90 into conformity with the corresponding regions on the film. Having calibrated the video monitor C, the contrast and brightness adjustments are now held constant such that the displayed image retains conformity with the hard copy images that will be obtained from the camera D.

This relatively simple calibration procedure enables the operator to check the calibration daily or at other prescribed intervals. The operator need only photograph the calibration pattern with the hard copy camera D and compare the photograph with the reference photograph. If both match, the camera is in calibration. Similarly, the operator may now readily compare the display of the video monitor C with the reference photograph. Alternately, the operator can make notes on the subregions which are present and other distinguishing characteristics of a properly calibrated image and use these notes rather than the reference photograph to check the calibration of the video monitor. When the operator finds the monitor below calibration (FIG. 5) or above calibration (FIG. 6), the above discused adjustments are made to bring the monitor into proper calibration (FIG. 4).

The invention has been described with reference to a preferred embodiment. Obviously, modifications and alterations will occur to others of ordinary skill in the art upon reading and understanding the preceding specification. It is intended that the invention be construed as including all such alterations and modifications insofar as they come within the scope of the appended claims or the equivalents thereof.

Having thus described a preferred embodiment, the invention is now claimed to be:

1. A method of verifying brightness and contrast adjustments of a hard copy camera which converts electronic signals indicative of an image into a photograph of the image, the method comprising:
   initially calibrating the camera
   immediately following the initial calibration, photographing a calibration test pattern to produce a reference photograph, the calibration pattern including at least two brightness and contrast calibration regions, each region having a background portion and a plurality of subregions, which subregions within each region having progressively greater contrast with the background portion such that the number of visible subregions varies with the brightness and contrast adjustment;
   at a subsequent time, again photographing said calibration pattern to produce a second photograph of the calibration pattern; and,
   comparing the number of visible subregions in the reference and second photographs to verify the brightness and contrast adjustments.

2. The method as set forth in claim 1 wherein the camera includes a video display means for converting the electronic signal into a light image and a photographic means for photographing the light image, the video display means including contrast and brightness adjustments, and further including the steps of adjusting settings on the video display brightness and contrast adjustments such that the number of visible subregions in the second photograph are brought into conformity with the number of visible subregions on the reference photograph.

3. The method as set forth in claim 2 further including after adjusting the settings of the video display means, taking a third photograph of the calibration pattern;
   comparing the number of subregions visible in the reference and third photographs; and,
   repeating the adjusting, photographing, and comparing steps until the photograph matches the reference photograph such that the camera means is accurately calibrated without optical density and luminescence measuring equipment.

4. The method as set forth in claim 1 wherein a video monitor having brightness and contrast adjustment is interconnected with the camera means for converting the electrical signals into a man-readable display, the method further including:
   displaying the calibration pattern on the video monitor;
   adjusting the video monitor brightness and contrast adjustments until the number of subregions visible in each region of the displayed calibration pattern corresponds to the number of visible subregions on the reference photograph.

5. The method as set forth in claim 1 wherein the subregions within the first region includes an array of dots, each of which has progressively more contrast with the background.

6. The method as set forth in claim 5 wherein each dot is two pixels by two pixels.

7. The method as set forth in claim 6 wherein the first region background is black.

8. The method as set forth in claim 7 wherein the second region has a white background and the subregions of the second region are an array of dots each having progressively more contrast with the white background.

9. The method as set forth in claim 1 wherein the subregions of one of the regions includes a plurality of bars interconnected in tuning fork-like patterns, the bars having different amounts of contrast with the background such that different bars and tuning fork-like arrangements are visible, not visible, and have differing degrees of visibility.

10. The method as set forth in claim 1 further including a first sine wave grating region in which the brightness varies generally sinusoidally therealong having a first brightness minima and maxima and with a first sine frequency.

11. The method as set forth in claim 10 further including a second sine wave grating region in which the brightness therealong varies generally sinusoidally with the first sine frequency and with second brightness maxima and minima.

12. The method as set forth in claim 10 further including another sine wave grating region in which the brightness varies sinusoidally therealong, the sine wave brightness variation varying in accordance with the summation of two sine waves to produce a complex sine wave pattern.

13. The method as set forth in claim 1 wherein the subregions have a regular geometric pattern.

14. A method of verifying a brightness and contrast adjustment of a video monitor for displaying medical diagnostic images and the like, the method comprising:
displaying a calibration pattern on the video monitor, which calibration pattern includes at least two brightness and contrast calibration regions, each region having a background portion and a plurality of subregions, the subregions each having progressively greater contrast with the background portion such that the number of visible subregions varies with the brightness and contrast adjustment; and,
varying brightness and contrast adjustments of the video monitor until a preselected number of the subregions are visible in each region.

15. The method as set forth in claim 14 further including determining the preselected number of visible subregions by:
initially calibrating the video monitor to preselected specifications with an optical intensity monitoring apparatus.

16. The method as set forth in claim 14 further including determining the preselected number of visible subregions from a reference photograph.

17. The method as set forth in claim 14 further including the step of photographing the video monitor display and comparing the number of subregions visible in the photograph with a number of visible subregions in a reference photograph.

18. A test pattern for verifying brightness and contrast calibration of a video device comprising:
means for generating test pattern data representative of a test pattern, the test pattern comprising:
a first region having a first background subregion and a plurality of first subregions, each of the first subregions having progressively greater contrast with the first background subregion such that the number of visible first subregions varies with the brightness and contrast adjustment, and,
a second region, distinct from the first region, having a second background subregion and a plurality of second subregions, the second subregions each having progressively greater contrast with the second background subregion such that the number of visible second subregions varies with the brightness and contraat adjustment; and,
means adapted for communicating the test pattern data to an associated video monitor.

19. A test pattern for verifying brightness and contrast calibration, the test pattern comprising:
a first region having a first background subregion and a plurality of first subregions, each of the first subregions having progressively greater contrast with the first background subregion such that the number of visible first subregions varied with the brightness and contrast adjustment;
a second region having a second background subregion and a plurality of second subregions, the second subregions each having progressively greater contrast with the second background subregion such that the number of visible second subregions varies with the brightness and contrast adjustment; and,
a third region, the brightness along the third region varying generally sinusoidally.

20. The pattern as set forth in claim 18 wherein at least the first subregions have regular geometric shapes.

21. A test pattern for verifying brightness and contrast calibration, the test pattern comprising:
a first region having a first background subregion and a plurality of first subregions, the first subregions have varying shades of gray and the first background subregion is selected to be one of white and black such that each of the first subregions having progressively greater contrast with the first background subregion whereby the number of visible first subregions varied with the brightness and contrast adjustment; and,
a second region having a second background subregion and a plurality of second subregions, the second subregions each having progressively greater contrast with the second background subregion such that the number of visible second subregions varied with the brightness and contrast adjustment.

22. A test pattern for verifying brightness and contrast calibration, the test pattern comprising:
a first region having a first background subregion and a plurality of first subregions, each of the first subregions having progressively greater contrast with the first background subregion such that the number of visible first subregions varies with the brightness an contrast adjustment; and,
a second region having a second background subregion and a plurality of second subregions, the second subregions each having progressively greater contrast with the second background subregion such that the number of visible second subregions varies with the brightness and contrast adjustment;
at least one of the subregions including a plurality of tuning fork-like patterns.

* * * * *